(12) United States Patent
Hoshiba et al.

(10) Patent No.: US 9,708,209 B2
(45) Date of Patent: Jul. 18, 2017

(54) GLASS TUBE CLEANING AND CUTTING SYSTEM AND METHOD FOR SAME

(71) Applicant: NIPPON ELECTRIC GLASS CO., LTD., Otsu-shi, Shiga (JP)

(72) Inventors: Kenichi Hoshiba, Shiga (JP); Masahiro Ichikawa, Shiga (JP); Toru Hasegawa, Shiga (JP)

(73) Assignee: NIPPON ELECTRIC GLASS CO., LTD., Otsu-shi (JP)

( * ) Notice: Subject to any disclaimer, the term of this patent is extended or adjusted under 35 U.S.C. 154(b) by 288 days.

(21) Appl. No.: 14/372,646

(22) PCT Filed: Nov. 20, 2012

(86) PCT No.: PCT/JP2012/080061
§ 371 (c)(1),
(2) Date: Jul. 16, 2014

(87) PCT Pub. No.: WO2013/111432
PCT Pub. Date: Aug. 1, 2013

(65) Prior Publication Data
US 2015/0020659 A1    Jan. 22, 2015

(30) Foreign Application Priority Data

Jan. 23, 2012 (JP) ................... 2012-010865

(51) Int. Cl.
*C03B 33/095* (2006.01)
*B08B 5/02* (2006.01)
(Continued)

(52) U.S. Cl.
CPC .............. *C03B 33/095* (2013.01); *B08B 5/02* (2013.01); *B08B 15/04* (2013.01); *B26D 3/16* (2013.01);
(Continued)

(58) Field of Classification Search
CPC ...... B26D 3/16; B26D 7/1854; B26D 7/1863; C03B 33/095; C03B 33/06; C03B 55/26
(Continued)

(56) References Cited

U.S. PATENT DOCUMENTS 2,416,121 A    2/1947  Schreiber et al.
2,534,547 A *  12/1950 Eisler .................... C03B 23/092
                                                        65/159
(Continued)

FOREIGN PATENT DOCUMENTS

DE    3507498 A1    9/1986
EP    1213085 A2    6/2002
(Continued)

OTHER PUBLICATIONS

Office Action in the corresponding European Patent Application No. 12866874.6 dated Nov. 6, 2015.
(Continued)

*Primary Examiner* — Kenneth E Peterson
(74) *Attorney, Agent, or Firm* — Global IP Counselors, LLP (57) ABSTRACT

A glass tube cleaning and cutting device includes a glass tube cutting device configured to cut an end portion of a glass tube while the glass tube cutting device rotates the glass tube having a predetermined length about a tube axis of the glass tube and conveys the glass tube in a direction orthogonal to the tube axis, at least one blower configured to blow air into an opening located on a first end portion side of the glass tube, and at least one cutting blade provided at a position opposite to the at least one blower interposing the glass tube therebetween, the at least one cutting blade being configured to impose thermal shock and scratches on an (Continued)

outer circumference surface of a second end portion side of the glass tube to cut the second end portion side of the glass tube.

13 Claims, 5 Drawing Sheets

(51) Int. Cl.
*B08B 15/04* (2006.01)
*B26D 3/16* (2006.01)
*B26D 7/18* (2006.01)
*C03C 25/70* (2006.01)
*C03B 33/06* (2006.01)
*C03B 35/26* (2006.01)

(52) U.S. Cl.
CPC ......... *B26D 7/1854* (2013.01); *B26D 7/1863* (2013.01); *C03B 33/06* (2013.01); *C03B 35/26* (2013.01); *C03C 25/70* (2013.01); *B65G 2249/04* (2013.01); *Y10T 83/0453* (2015.04); *Y10T 83/207* (2015.04); *Y10T 83/2066* (2015.04)

(58) Field of Classification Search
USPC ...................................................... 83/54, 99
See application file for complete search history.

(56) References Cited

U.S. PATENT DOCUMENTS

| | | | |
|---|---|---|---|
| 3,071,497 A * | 1/1963 | Hinson | ................... B08B 3/126 134/1 |
| 3,652,247 A | 3/1972 | Nakayama et al. | |
| 4,226,607 A * | 10/1980 | Domken | ................. A61J 1/065 65/105 |
| 5,419,224 A | 5/1995 | Gamperling et al. | |
| 9,388,068 B2 * | 7/2016 | Hoshiba | ................ C03B 33/095 |
| 9,522,954 B2 * | 12/2016 | Wu | ........................ C07K 16/28 |
| 2003/0150845 A1 | 8/2003 | Tian | |
| 2011/0100401 A1 | 5/2011 | Fiorentini | |
| 2013/0104712 A1 | 5/2013 | Harris et al. | |

FOREIGN PATENT DOCUMENTS

| | | |
|---|---|---|
| EP | 1375092 A1 | 1/2004 |
| EP | 1671762 A1 | 6/2006 |
| EP | 1889277 B1 | 5/2009 |
| FR | 27726555 A1 | 6/1999 |
| GB | 2441224 A | 2/2008 |
| JP | S47-31082 Y1 | 9/1972 |
| JP | S54-43005 B1 | 12/1979 |
| JP | 2011-522685 A | 8/2011 |
| WO | 0176777 A1 | 10/2001 |

OTHER PUBLICATIONS

Supplementary Search Report in the corresponding European Patent Application No. 12866874.6 dated Nov. 2, 2015.
International Search Report of the corresponding International Application No. PCT/JP2012/080061, dated Mar. 12, 2013.
Written Opinion of the corresponding International Application No. PCT/JP2012/080061, dated Mar. 12, 2013.

* cited by examiner

PRIOR ART

FIG. 8

PRIOR ART

FIG. 9

PRIOR ART

GLASS TUBE CLEANING AND CUTTING SYSTEM AND METHOD FOR SAME

CROSS-REFERENCE TO RELATED APPLICATIONS

This U.S. National stage application claims priority under 35 U.S.C. §119(a) to Japanese Patent Application No. 2012-010865, filed in Japan on Jan. 23, 2012, the entire contents of which are hereby incorporated herein by reference.

BACKGROUND OF THE INVENTION

Field of the Invention

The present invention relates to a glass tube cutting device for cutting an end portion of a glass tube having a predetermined length and a glass tube cutting method.

Description of Related Art

For instance, glass tubes used for luminescent lamps, medicinal containers such as ampoules and vials, back light for liquid crystal panels are generally produced by the processes mentioned below.

Figure 7:
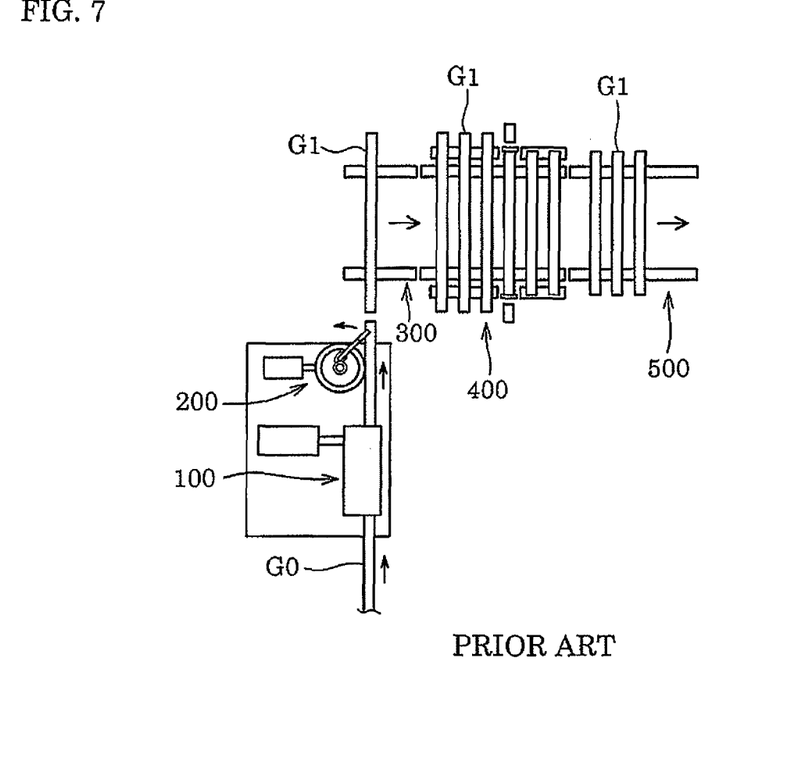
FIG. 7 is a schematic plan view indicating a production process of conventional glass tubes.

As shown in FIG. 7, a rough cutting process to obtain a plurality of glass tubes G1 is carried out by cutting a continuous glass tube G0 formed by pulling the tube using, for example, a Danner method for each predetermined length by a rough cutting device 200 while pulling with a tube puller 100. Subsequently, respective glass tubes G1 are fed in a parallel state by a conveyor 300. And a re-cutting process to re-cut both ends of respective glass tubes G1 is re-cut by a re-cutting device 400 to produce f finished goods of glass tubes G1. Subsequently, the glass tubes G1 are conveyed to a delivery process by a conveyor 500.

Conventionally, a cutting device applied to a glass tube ends forming device described in Japanese Unexamined Patent Application Publication No. 54-43005 A is known as a re-cutting device 400 to re-cut ends of a glass tube.

Figure 8:
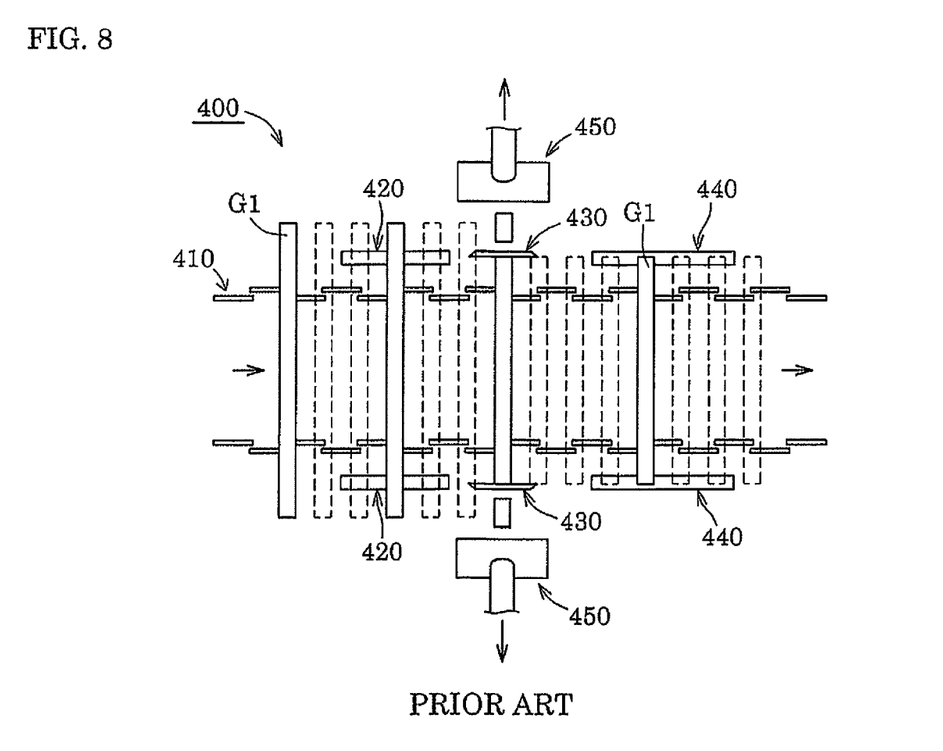
FIG. 8 is a schematic plan view of a conventional glass tube cutting device.

As shown in FIG. 8, the cutting device comprises: a conveyor 410 configured to convey a plurality of glass tubes G1 each having a predetermined length in a direction orthogonal to a tube axis of the glass tube while the cutting device rotates the plurality of glass tubes about tube axes of the glass tubes; a pair of preheat burners 420 provided on both sides of a conveyance route of the conveyor 410, the pair of preheat burners 420 being configured to preheat both ends of portions of the respective glass tubes G1 to be cut; a pair of cutting blades 430 provided on a more downstream side of the respective conveying glass tubes G1 than respective preheat burners 420, the pair of cutting blades 430 being configured to re-cut both ends of the respective glass tubes G1; and a pair of glazing burners 440 provided on a more downstream side of the respective conveying glass tubes G1 than respective cutting blades 430, the pair of glazing burners 440 being configured to glaze an end portion of the respective re-cut glass tubes G1. The cutting device is configured to impose thermal shock and scratches on almost all circumferences of the outer circumference surface of the respective glass tubes G1 by contacting the cutting blades 430 with the outer circumference surface of both ends of the respective glass tubes G1 rotating about the tube axes of the glass tubes. The thermal shock creates cracks resulting from the scratches on the outer circumference of the respective glass tubes G1 and re-cuts the ends of the respective glass tubes G1 at a right angle relative to the tube axes of the glass tubes.

SUMMARY OF THE INVENTION

Figure 9:
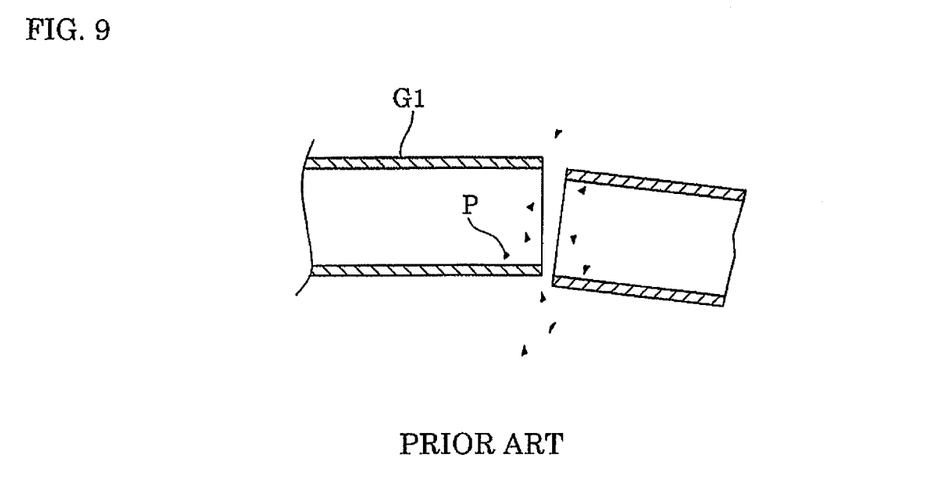
FIG. 9 is a partial vertical cross-sectional view of a glass tube indicating a state in which finely-crushed glass is adhered to an inner surface of the glass tube in a cutting step by use of a conventional glass tube cutting device.

However, as shown in FIG. 9, in a conventional glass tube cutting device, there was a disadvantage that finely-crushed glass P generated at the time of cutting a glass tube G1 entered inside the glass tube from cutting openings of the glass tube G1 and was adhered to an inner surface of the glass tube, resulting in deterioration of purity of the glass tube G1.

As shown in FIG. 8, in a conventional glass tube cutting device, a pair of suction devices 450 configured to suck surrounding air of end portions of respective glass tubes G1 are provided near respective cutting blades 430 and are configured to suck and remove finely-crushed glass P generated when cutting. Although it was possible to suck and remove almost all of finely-crushed glass P that scattered outside respective glass tubes G1 using the pair of suction devices 450, it was impossible to effectively suck and remove finely-crushed glass P that scattered inside the respective glass tubes G1 because conventionally, both ends of the respective glass tubes G1 were simultaneously sucked and removed by the pair of suction devices 450.

Such a disadvantage of adhesion of the finely-crushed glass P to the inner surface of the glass tube was particularly important to glass tubes for medicinal containers such as ampoules and vials in which purity inside tubes had been valued and careful cleaning work of the inner surface of each glass tube had to be conducted.

The present invention has made in view of the aforementioned disadvantage of the conventional glass tube cutting device. It is an object of the present invention to provide a glass tube cleaning and cutting device and a method for same to reliably prevent deterioration of purity of the glass tube caused by the adhesion of finely-crushed glass to the inner surface of the glass tube.

The summary of the present invention is described as below.

In a first preferred aspect, there is provided a glass tube cleaning and cutting device according to the present invention which comprise: a glass tube cutting device configured to cut an end portion of a glass tube while the glass tube cutting device rotates the glass tube having a predetermined length about a tube axis of the glass tube and conveys the glass tube in a direction orthogonal to the tube axis; at least one blower configured to blow air into an opening located on a first end portion side of the glass tube; and at least one cutting blade provided at a position opposite to the at least one blower interposing the glass tube therebetween, the at least one cutting blade being configured to impose thermal shock and scratches on an outer circumference surface of a second end portion side of the glass tube to cut the second end portion side of the glass tube.

In a second preferred aspect, there is provided a glass tube cleaning and cutting device according to the present invention which comprises: a glass tube cutting device configured to cut both end portions of a glass tube while the glass tube cutting device rotates the glass tube having a predetermined length about a tube axis of the glass tube and conveys the glass tube in a direction orthogonal to the tube axis; a first blower configured to blow air into an opening located on a first end portion side of the glass tube; a first cutting blade provided at a position opposite to the first blower interposing the glass tube therebetween, the first cutting blade being configured to impose thermal shock and scratches on an outer circumference surface of a second end portion side of the glass tube to cut the second end portion side of the glass tube; a second blower provided on a more downstream side of the conveying glass tube than the first cutting blade, the second blower being configured to blow air into an opening located on the second end portion side of the glass tube that has been cut by the first cutting blade; and a second cutting blade provided at a position opposite to the second blower interposing the glass tube therebetween, the second cutting blade being configured to impose thermal shock and scratches on an outer circumference surface of the first end portion side of the glass tube to cut the first end portion side of the glass tube.

In a third preferred aspect of the glass tube cleaning and cutting device according to the present invention, at least one suction device configured to suck surrounding air of an end portion of the glass tube is provided near the at least one cutting blade.

In a fourth preferred aspect of the glass tube cleaning and cutting device according to the present invention, the blower includes a blowing nozzle having a flat-shaped nozzle port located along a conveyance route of the glass tube.

In a fifth preferred aspect, there is provided a method for cleaning and cutting a glass tube according to the present invention which comprises the steps of: cutting an end portion of a glass tube while rotating the glass tube having a predetermined length about a shaft center of the glass tube and conveying the glass tube in a direction orthogonal to a tube axis of the glass tube; blowing air into an opening located on a first end portion side of the glass tube; and imposing thermal shock and scratches on an outer circumference surface of a second end portion side of the glass tube into which air has been blown by the blowing step to cut the second end portion side of the glass tube.

In a sixth preferred aspect, there is provided a method for cleaning and cutting a glass tube according to the present invention which comprises: cutting an end portion of the glass tube while rotating the glass tube having a predetermined length about a shaft center of the glass tube and conveying the glass tube in a direction orthogonal to a tube axis of the glass tube; a first blowing step of blowing air into an opening located on a first end portion side of the glass tube; a first cutting step of imposing thermal shock and scratches on an outer circumference surface of a second end portion side of the glass tube to cut the second end portion side of the glass tube; a second blowing step of blowing air into an opening located on the second end portion side of the glass tube that has been cut by the first cutting step; and a second cutting step of imposing thermal shock and scratches on an outer circumference surface of the first end portion side of the glass tube into which air has been blown by the second blowing step to cut the first end portion of the glass tube.

In a seventh preferred aspect of the method for cleaning and cutting a glass tube according to the present invention, the cutting step includes sucking surrounding air of an end portion of the glass tube.

In an eighth preferred aspect of the method for cleaning and cutting a glass tube according to the present invention, the method further comprises the step of blowing air into an opening located in an end portion of the glass tube over a period after the cutting step.

Advantages of the Invention

According to the glass tube cleaning and cutting device and the method for cleaning and cutting a glass tube of the present invention, when one side of end portions of the glass tube is cut by a cutting blade, it is possible to blow air from an opening located in an end portion of the glass tube located at an opposite side of the glass tube by a blower. This makes it possible to reliably blow off finely-crushed glass generated at the time of cutting to the outside of the glass tube, resulting in preventing the finely-crushed glass from being adhered to an inner surface of the glass tube and deterioration in purity of the glass tube.

The glass tube cleaning and cutting device and the method for cleaning and cutting a glass tube of the present invention comprises the steps of: blowing air into an opening located on a first end portion side of the glass tube by use of a first blower to clean and cut a second end portion side of the glass tube by use of a first cutting blade; an blowing air into an opening located on the second end portion side of the glass tube by use of a second blower to clean and cut the second end portion side by use of a second cutting blade; and then cutting alternately both ends of the glass tube. According to the present invention, it is possible to reliably blow off finely-crushed glass generated at the time of each cutting to the outside the glass tube even when both ends of the glass tube are cut.

According to the glass tube cleaning and cutting device and the method for cleaning and cutting a glass tube in which at least one suction device configured to suck surrounding air of an end portion of the glass tube is provided near the at least one cutting blade, it is possible to rapidly remove by sucking finely-crushed glass generated at the time of cutting to the outside of the device, which leads to prevent the finely-crushed glass from being re-adhered to the glass tube. In addition, sucking by such a suction device makes it possible to promote the blowing out of air from the end portion of the glass tube.

According to the glass tube cleaning and cutting device, in which at least one blower includes a blowing nozzle having a flat-shaped nozzle port located along a conveyance route of the glass tube, it is possible to inject horizontally long belt-like air located along the conveyance route from the nozzle port and to reliably blow air into an opening of each glass tube moved by a conveyor.

According to the method for cleaning and cutting a glass tube including the step of blowing air into an opening of each glass tube over a period after the cutting step by use of a cutting blade, it is possible to cause air to come out of the cut-off end portion after cutting each glass tube and to reliably blow off finely-crushed glass generated at the time of cutting to the outside of each glass tube.

DESCRIPTION OF THE PREFERRED EMBODIMENTS

Figure 1:
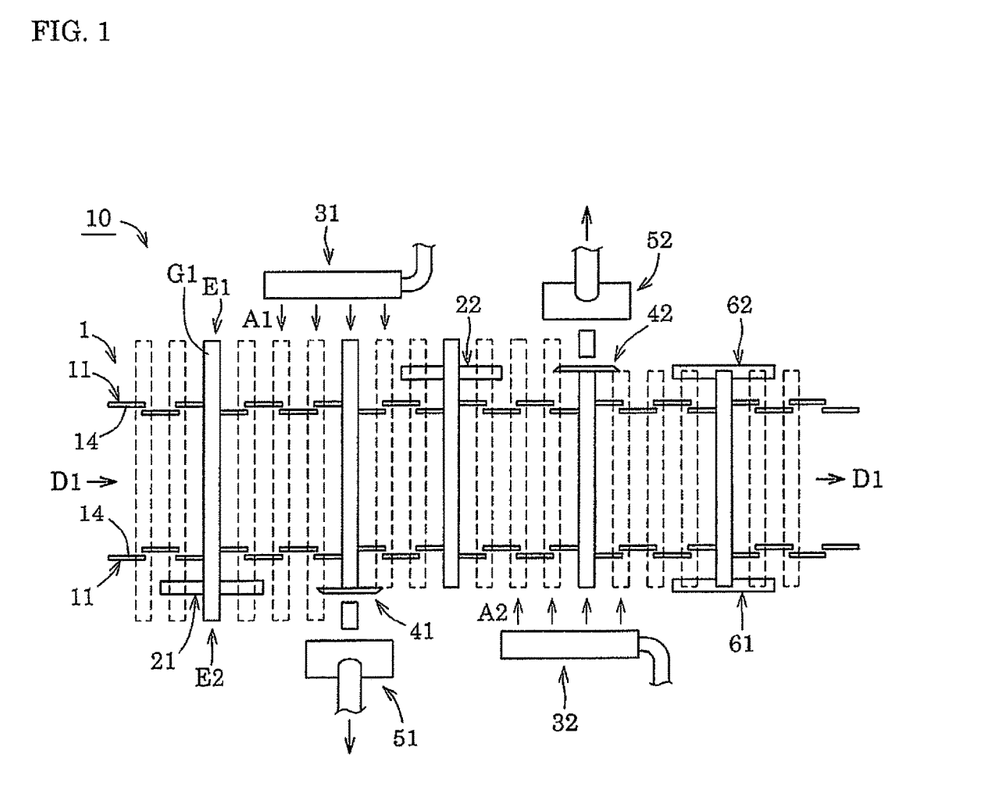
FIG. 1 is a schematic plan view of a glass tube cleaning and cutting device in an embodiment of the present invention.

As shown in FIG. 1, a glass tube cleaning and cutting device 10 in an embodiment of the present invention comprises: a conveyor 1 configured to continuously convey in parallel a plurality of glass tubes G1 each having a predetermined length; preheat burners (21, 22) provided on both sides of a conveyance route of the conveyor 1, the preheat burners heating portions to be cut in end portions of respective glass tubes G1; blowers (31, 32) provided on a more downstream side of the respective conveying glass tubes G1 than respective preheat burners (21, 22), the blowers being configured to blow air into openings located in the end portions of the respective glass tubes G1; cutting blades (41, 42) for cutting end portions of the respective glass tubes G1; suction devices (51, 52) provided near respective cutting blades (41, 42), the suction devices being configured to suck surrounding air of end portions of the respective glass tubes G1; and a pair of glazing burners (61, 62) provided on a most downstream side of the conveyance route of the conveyor 1, the pair of glazing burners being configured to glaze cut-off end portions of the respective glass tubes G1.

As shown in FIG. 1, the conveyor 1 is composed of a pair of endless roller chain complexes 11 for winding between a sprocket (not shown) provided in parallel and conveys the respective glass tubes G1 that have bridged over such a pair of roller chain complexes 11 in a direction orthogonal to tube axes of the glass tubes.

Figure 2:
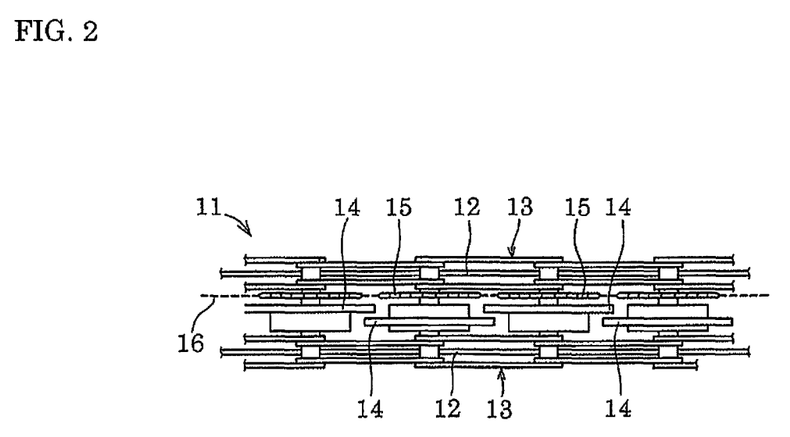
FIG. 2 is a partially enlarged plan view of a roller chain complex of a conveyor in a glass tube cleaning and cutting device in the embodiment of the present invention.
Figure 3:
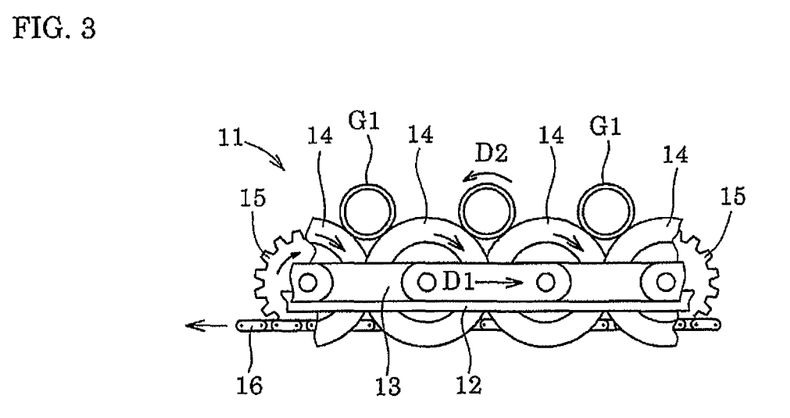
FIG. 3 is a partially enlarged side view of a roller chain complex of a conveyer in a glass tube cleaning and cutting device in the embodiment of the present invention.

As shown in FIGS. 2 and 3, each roller chain complex 11 comprises: a pair of endless roller chains 13 for each travelling on a guide rail 12; a plurality of disk-shaped carrier disks 14 dependent-rotatably supported by a plurality of roller axes of the pair of endless roller chains 13 arranged between the endless roller chains 13; a plurality of sprockets 15 concentrically fixed to respective carrier disks 14; and an endless driving chain 16 engaged with all of the plurality of sprockets 15 travelling in circle.

The respective carrier disks 14 have diameters greater than pitches of the roller chains 13 and are alternately disposed in a zigzag manner so as to overlap each outer peripheral part from a lateral view. As a result, recesses are formed between adjacent carrier disks 14 and then the glass tubes G1 are stably put on the recesses. And the respective carrier disks 14 are caused to travel by causing the roller chains 13 to travel in circle by use of a driving source not shown and convey the respective glass tubes G1 in a direction orthogonal to the tube axes of the glass tubes (an arrow D1 shown in FIG. 3).

Independent from the roller chains 13, the driving chain 16 is caused to travel in circle by the driving source not shown to rotate the respective carrier disks 14 via the sprockets 15. As a result, the respective glass tubes G1 are rotated about the shaft center of the glass tubes (an arrow D2 shown in FIG. 3). In this manner, the conveyor 1 continuously conveys the plurality of glass tubes G1 arranged in parallel in the direction orthogonal to the tube axes of the glass tubes while the conveyor 1 continuously rotates the glass tubes G1 about the tube axes of the glass tubes.

As shown in FIG. 1, preheat burners (21, 22) are each composed of a gas burner with a plurality of flame holes arranged along the conveyance route of the conveyor 1 and heat the portions to be cut in the end portions of the respective glass tubes G1 for a predetermined time from downward that move while being rotated about the tube axes of the glass tubes. In an embodiment of the present invention, the glass tube cleaning and cutting device includes a first preheat burner 21 and a second preheat burner 22 to heat both ends of the portions to be cut in the respective glass tubes G1. The second preheat burner 22 configured to heat a first end portion E1 side of a glass tube G1 is located at an opposite side of the first preheat burner 21 configured to heat a second end portion E2 side of the glass tube G1 and is provided on a more downstream side of the conveying glass tube G1 (hereinafter simply referred to as "a downstream side of a conveying glass tube") than the first preheat burner 21.

As shown in FIG. 1, blowers (31, 32) each have a predetermined length along the conveyance route of the conveyor 1 and are configured to blow air into openings located in end portions of the respective glass tubes G1 moved by the conveyor 1 for a predetermined time. In this embodiment of the present invention, there are provided a first blower 31 and a second blower 32 configured to blow respective air (A1, A2) into openings located at both ends of the respective glass tubes G1. The first blower 31 configured to blow air A1 into openings of the first end portion E1 side of the respective glass tubes G1 is located at the opposite side of the aforementioned first preheat burner 21 interposing the conveyance route of the conveyor 1 therebetween. And the first blower 31 is provided on a more downstream side of the conveying glass tubes than the first preheat burner 21 and is provided on a more upstream side of the conveying glass tubes than the second preheat burner 22. The second blower 32 configured to blow air A2 into openings of the second end portion E2 side of the respective glass tubes G1 is located at the opposite side of the second preheat burner 22 interposing the conveyance route of the conveyor 1 therebetween and is provided on a more downstream side of the conveying glass tube than the second preheat burner 22.

Figure 4:
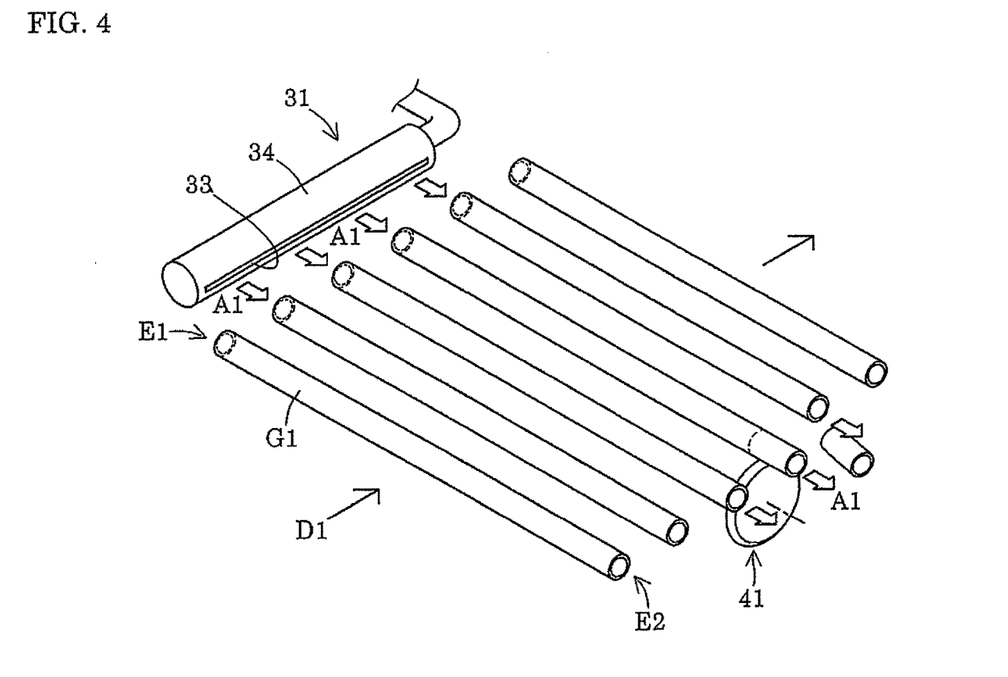
FIG. 4 is a perspective view of an important part of a blower and a cutting blade in a glass tube cleaning and cutting device in an embodiment of the present invention.

As shown in FIG. 4, the blowers (31, 32) in this embodiment of the present invention each include a blowing nozzle 34 having a flat-shaped nozzle port 33 along the conveyance route of the respective glass tubes G1 and inject purified air supplied from a supply source not shown from the nozzle port 33 in a horizontally long belt manner. Horizontally long belt-like air A1 located along the conveyance route is injected from the nozzle port 33 to be reliably blown into the openings of the respective glass tubes G1 to be moved by the conveyor 1.

Figure 5:
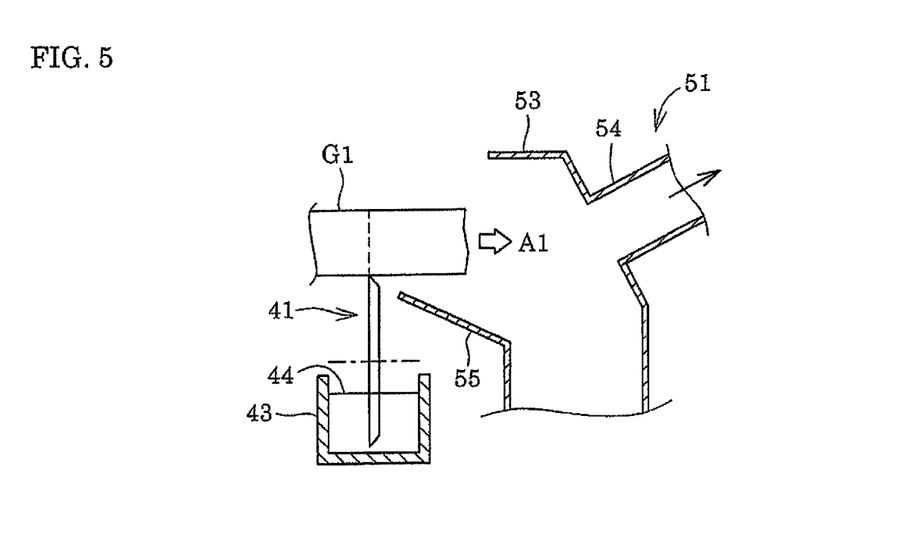
FIG. 5 is a cross-sectional view of an important part of a cutting blade and a blower in a glass tube cleaning and cutting device in the embodiment of the present invention.

As shown in FIGS. 4 and 5, cutting blades (41, 42) are each composed of a disk-shaped cutter for continuously rotating about a horizontal axis by use of a driving source not shown, in which a lower part of the cutter is soaked into cooled water 44 in a water tank 43. Both ends of the portions of the respective glass tubes G1 rotating about the tube axes of the glass tubes by use of the conveyor 1 to be cut are preheated by the aforementioned preheat burners (21, 22) and are caused to contact with the cutting blades (41, 42) to impose thermal shock and scratches on almost all circumferences of the outer circumference surface of the respective glass tubes G1 so as to cut end portions of the respective glass tubes G1 at right angles relative to tube axes thereof.

As shown in FIG. 1, in this embodiment of the present invention, the glass tube cleaning and cutting device 10 includes a first cutting blade 41 and a second cutting blade 42 for each cutting both ends of the respective glass tubes G1. The first cutting blade 41 for cutting the second end portion E2 side of the respective glass tubes G1 is provided on a more downstream side of the conveying glass tubes than the first preheat burner 21 and is provided on a more upstream side of the conveying glass tubes than the second preheat burner 22 on the same side of the preheat burner 21 relative to the conveyance route of the conveyor 1. The second cutting blade 42 for cutting the first end portion E1 side of the respective glass tubes G1 is provided on a more downstream side of the conveying glass tubes than the second preheat burner 22 on the same side of the second preheat burner 22 relative to the conveyance route of the conveyor 1.

As shown in FIG. 5, suction devices (51, 52) each comprise: a hood 53 for surrounding an end portion of a glass tube G1; and a suction duct 54 coupled to the hood 53. And the suction devices (51, 52) remove by sucking finely-crushed glass generated at the time of cutting the glass tube G1 through the suction duct 54 by a suction source not shown. Cut pieces cut by the cutting blades (41, 42) are each guided by a guide 55 provided on the side of the cutting blades (41, 42), resulting in gravity-fall to be collected.

As shown in FIG. 1, in this embodiment of the present invention, the glass tube cleaning and cutting device 10 includes a first suction device 51 and a second suction device 52 each configured to suck surrounding air of both ends of respective glass tubes G1. The first suction device 51 configured to suck surrounding air of a second end portion E2 side of the respective glass tubes G1 is provided on a more downstream side of the conveying glass tubes than the first preheat burner 21 and is provided on a more upstream side of the conveying glass tubes than the second preheat burner 22 on the same side of the first preheat burner 21 relative to the conveyance route of a conveyor 1. The second suction device 52 configured to suck surrounding air of a first end portion E1 side of the respective glass tubes G1 is provided on a more downstream side of the conveying glass tubes than the second preheat burner 22 on the same side of the second preheat burner 22 relative to the conveyance route of the conveyor 1.

As shown in FIG. 1, the glazing burners (61, 62) are each composed of a gas burner where a plurality of flame holes are aligned along the conveyance route of the conveyor 1 and glaze cut-off end portions of the respective glass tubes G1 for moving while rotating about the tube axes of the respective glass tubes for a predetermined time by heating from below. In this embodiment of the present invention, the glass tube cleaning and cutting device 10 includes a first glazing burner 61 and a second glazing burner 62 configured to heat both ends of the respective glass tubes G1 after cutting. The second glazing burner 62 configured to heat a first end portion E1 side of the respective glass tubes G1 after cutting is provided on a more downstream side of the conveying glass tubes on the same side of the second cutting blade 42 relative to the conveyance route of the conveyor 1. The first glazing burner 61 configured to heat a second end portion E2 side of the respective glass tubes G1 is provided on a downstream side of the conveying second blower 32 on the same side of the first cutting blade 41 relative to the conveyance route of the conveyor 1. In addition, the first glazing burner 61 may be provided on a downstream side of the conveying first cutting blade 41 and may be provided on an upstream side of the conveying second blower 32 on the same side of the first cutting blade 41 relative to the conveyance route of the conveyor 1 as well.

Mainly referring to FIG. 1, there is shown below a method for cleaning and cutting a glass tube G1 by use of the glass tube cleaning and cutting device 10 of the present invention.

The glass tube cleaning and cutting device 10 in this embodiment of the present invention cleans and cuts both ends of respective glass tubes G1 while continuously conveying a plurality of glass tubes G1 by use of the conveyor 1. Any of respective components of the preheat burners (21, 22), the blowers (31, 32), the cutting blades (41, 42), the suction devices (51, 52), and the glazing burners (61, 62) operate continuously to perform each step below by causing the respective glass tubes G1 to pass through respective components.

First, a first heating step is performed for respective glass tubes G1 during transport. Specifically, portions to be cut on the second end portion E2 side of the respective glass tubes G1 are preheated by the first preheat burner 21.

Second, a first blowing step for the respective glass tubes G1 is performed. Specifically, air A1 is blown into openings of the first end portion E1 side of the respective glass tubes G1 by the first blower 31 to cause air A1 to come out of openings of the second end portion E2 side of the respective glass tubes G1 as shown in FIG. 4.

Figure 6:
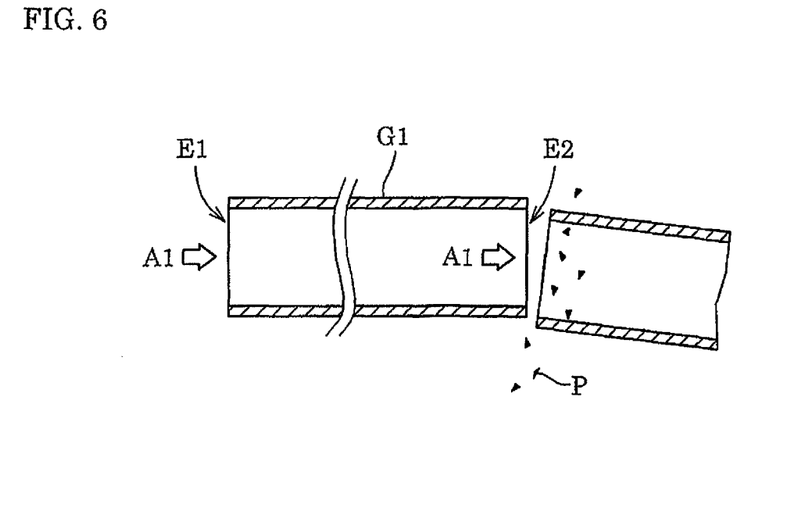
FIG. 6 is a partial vertical cross-sectional view of a glass tube illustrating a state in which finely-crushed glass is blown off to the outside of the glass tube in a cutting step by use of a glass tube cleaning and cutting device in the embodiment of the present invention.

And then a first cutting step is performed for the respective glass tubes G1 into which air A1 has been blown by the first blowing step. Specifically, the second end portion E2 side of the respective glass tubes G1 is cut by the first cutting blade 41. At this time, as shown in FIG. 6, air A1 comes out of an opening of a second end portion E2 side of each glass tube G1. As a result, finely-crushed glass P generated at the time of cutting is blown off to the outside of each glass tube G1, so that there is no possibility of finely-crushed glass P being adhered to an inner surface of each glass tube G1.

In this embodiment of the present invention, surrounding air of a second end portion E2 side of each glass tube G1 is sucked by the first suction device 51 when cutting each glass tube G1. This makes it possible to remove finely-crushed glass P that has been blown off by air A1 to the outside of the glass tube cleaning and cutting device and prevent the finely-crushed glass P from being adhered again to each glass tube G1.

As shown in FIG. 4, in this embodiment of the present invention, air A1 is blown into an opening of a first end portion E1 side of each glass tube G1 by the first blower 31 to cause air A1 to come out of an opening of a second end portion E2 side of each glass tube G1 from the stage before cutting each glass tube G1 by use of the first cutting blade 41. However, air A1 may come out of the second end portion E2 side of each glass tube G1 when cutting or after cutting each glass tube G1. It is the same with a cutting step by the second cutting blade 42 mentioned below.

As shown in FIG. 4, in this embodiment of the present invention, blowing air A1 into the opening of the first end portion E1 side of each glass tube G1 is continued even after cutting each glass tube G1 by use of the first cutting blade 41 and the blowing off of the finely-crushed glass P is also continued even after cutting an end portion of each glass tube G1.

Subsequently, a second heating step for each glass tube G1 where the second end portion E2 side of each glass tube G1 has been cut by the first cutting step is performed. More specifically, as shown in FIG. 1, portions to be cut on the first end portion E1 side of each glass tube G1 are preheated by the second preheat burner 22.

Subsequently, a second blowing step for each glass tube G1 is performed. Specifically, air A2 is blown into the openings of the second end portion E2 side of the respective glass tubes G1 by the second blower 32 to cause air A2 to come out of the openings of the first end portion E1 side of the respective glass tubes G1.

A second cutting step for each glass tube G1 into which air A2 has been blown by the second blowing step. More specifically, each first end portion E1 side of each glass tube G1 is cut by the second cutting blade 42. At this time, air A2 comes out of an opening of each first end portion E1 side of each glass tube G1. As a result, finely-crushed glass P generated when cutting is blown off to the outside of each glass tube G1 and therefore, there is no possibility of the finely-crushed glass P being adhered to an inner surface of each glass tube G1.

In this embodiment of the present invention, surrounding air of each first end portion E1 side of each glass tube G1 is sucked by the second suction device 52 when cutting each glass tube G1. This removes finely-crushed glass P that has been blown off to the outside of the glass tube cleaning and cutting device by air A2 to prevent the finely-crushed glass P from being adhered again to each glass tube G1.

Subsequently, glazing treatment is simultaneously performed for both sides of cut-off end portions of the respective glass tubes G1 by the first glazing burner 61 and the second glazing burner 62. In this way, cleaning and cutting of both ends of the respective glass tubes G1 by use of the glass tube cleaning and cutting device 10 in one embodiment of the present invention is completed.

According to the glass tube cleaning and cutting device 10 being an embodiment of the present invention, when cutting one side of an end portion of each glass tube G1 by use of the cutting blades (41, 42), it is possible to cause air (A1, A2) to come out of an end portion to be cut by blowing air (A1, A2) into an opening located in an end portion of the opposite side to each glass tube G1 by use of the blowers (31, 32). This makes it possible to reliably blow off finely-crushed glass P generated when cutting to the outside of each glass tube G1 and prevent the finely-crushed glass P from being adhered to an inner surface of each glass tube G1, resulting in prevention of deterioration in purity.

According to the glass tube cleaning and cutting device 10 being an embodiment of the present invention, air A1 is blown into an opening located in a first end portion E1 side of each glass tube G1 by the first blower 31 to clean and cut a second end portion E2 side of each glass tube G1 by the first cutting blade 41. Subsequently, air A2 is blown into an opening of the second end portion E2 side of each glass tube G1 by the second blower 32 to clean and cut the second end portion E2 side of each glass tube G1 by use of the second cutting blade 42, resulting in alternately cut of both ends of each glass tube G1. As a result, it is possible to reliably blow off finely-crushed glass P generated at each time of cutting to the outside of each glass tube G1, even when cutting both ends of each glass tube G1.

In this embodiment of the present invention, since the suction devices (51, 52) configured to each suck surrounding air of an end portion of each glass tube G1 are provided near the cutting blades (41, 42), it is possible to rapidly remove by sucking finely-crushed glass P generated when cutting and prevent finely-crushed glass P from being adhered again to each glass tube G1. In addition, it is possible to promote air (A1, A2) to come out of an end portion of each glass tube G1 by the suction of the suction devices (51, 52).

In this embodiment of the present invention, the blowers (31, 32) each include a blowing nozzle 34 having a flat-shaped nozzle port 33 along the conveyance route of each glass tube G1 in the conveyor 1, so that it is possible to inject air (A1, A2) located along the conveyance route of each glass tube G1 from the nozzle port 33. This makes it possible to reliably blow air (A1, A2) into an opening of each glass tube G1 that is caused to travel by the conveyor 1. Depending on the length of each glass tube G1, it becomes possible to blow off finely-crushed glass P located outside each glass tube G1 by air (A1, A2) which comes out of the nozzle port 33 and flows outside each glass tube G1.

In this embodiment of the present invention, since air (A1, A2) is blown into an opening of each glass tube G1 over a period after cutting each glass tube G1 by use of the cutting blades (41, 42), even after the cutting of each glass tube G1, it is possible to cause air (A1, A2) to come out of the cut-off end portion and therefore, it is possible to reliably blow off finely-crushed glass P generated when cutting to the outside of each glass tube G1.

While the glass tube cleaning and cutting device and the method thereof of the present invention have thus been described so far, the present invention may be embodied in other forms.

For instance, as shown in FIG. 4, while the blowers (31, 32) each include a blowing nozzle 34 having a flat-shaped nozzle port 33 along the conveyance route of respective glass tubes G1, the present invention is not limited to this but a large number of blowing nozzles having circle hole-shaped nozzle ports may be aligned along the conveyance route of respective glass tubes G1 to inject horizontally long belt-like air (A1, A2).

It is to be understood that the present invention may be embodied in several forms in which any and all improvements, modifications, and variations may be added based on the knowledge of those skilled in the art without departing from the spirit of the present invention. And the present invention may be embodied in the forms in which any matters to define the invention are replaced by other art within the scope in which identical operation or effects are created. In addition, the invention may be embodied in the forms in which matters to define the invention integrally formed are composed of a plurality of members or matters to define the invention composed of a plurality of members are integrally formed.

What is claimed is:
1. A glass tube cleaning and cutting system, comprising:
   a conveyor configured to convey a glass tube in a direction transverse to a tube axis;
   a rotator configured to rotate the glass tube about the tube axis of the glass tube while the conveyor conveys the glass tube;
   a cutting blade configured to impose scratches on an outer circumference surface of an end portion of the glass tube to cut the end portion of the glass tube, while the rotator rotates the glass tube about the tube axis of the glass tube and the conveyor conveys the glass tube in a direction transverse to the tube axis,
   a temperature changing device adapted to make the cutting blade be at a temperature different from a temperature of the glass tube to impose thermal shock on the outer circumference surface of the end portion of the glass tube while the cutting blade imposes the scratches; and
   a blower disposed at a location opposing the cutting blade and extending upstream of the cutting blade with respect to the direction in which the conveyor conveys the glass tube, such that the blower is configured to begin blowing air into an opening located at an other end portion of the glass tube that is opposite to the end portion before the cutting blade begins cutting the end portion of the glass tube, and to continue blowing the air into the opening while the cutting blade cuts the end portion of the glass tube.

2. The glass tube cleaning and cutting system according to claim 1, wherein the blower includes a blowing nozzle having a flat-shaped nozzle port located along a conveyance route of the glass tube.

3. The glass tube cleaning and cutting system according to claim 1, wherein the temperature changing device comprises a preheat burner and a liquid container that are configured to, along with the cutting blade, cooperatively impose the thermal shock on the outer circumference surface of the end portion of the glass tube.

4. A method for cleaning and cutting a glass tube, comprising:
providing the glass tube cleaning and cutting system of claim 1,
operating the blower to blow air into the opening located at the first end portion of the glass tube; and
after the operating of the blower to blow the air has already begun, operating the temperature changing device and the cutting blade to impose the thermal shock and the scratches on the outer circumference surface of a second end portion of the glass tube opposite to the first end portion into which air is being blown by the blower to cut the second end portion of the glass tube while the rotator is rotating the glass tube about the tube axis of the glass tube and the conveyor is conveying the glass tube in a direction transverse to the tube axis of the glass tube.

5. The method for cleaning and cutting a glass tube according to claim 4, further comprising sucking surrounding air at the end portion of the glass tube while imposing the thermal shock and scratches on the outer circumference surface of the end portion of the glass tube.

6. The method for cleaning and cutting a glass tube according to claim 4, further comprising blowing air into a second opening located in the end portion of the glass tube during a period after the end portion has been cut.

7. A glass tube cleaning and cutting system, comprising:
a conveyor configured to convey a glass tube in a direction transverse to a tube axis;
a rotator configured to rotate the glass tube about the tube axis of the glass tube while the conveyor conveys the glass tube;
a first cutting blade configured to impose scratches on an outer circumference surface of an end portion of the glass tube to cut the end portion of the glass tube, while the rotator rotates the glass tube about the tube axis of the glass tube and the conveyor conveys the glass tube in a direction transverse to the tube axis,
a first temperature changing device adapted to make the first cutting blade be at a first temperature different from a temperature of the glass tube to impose thermal shock on the outer circumference surface of the end portion of the glass tube while the first cutting blade imposes the scratches;
a second cutting blade configured to imposes scratches on the outer circumference surface of an other end portion of the glass tube, that is opposite to the end portion, to cut the other end portion of the glass tube, while the rotator rotates the glass tube about the tube axis of the glass tube and the conveyor conveys the glass tube in the direction transverse to the tube axis,
a second temperature changing device adapted to make the second cutting blade be at a second temperature different from the temperature of the glass tube to impose thermal shock on the outer circumference surface of the other end portion of the glass tube while the second cutting blade imposes the scratches;
a first blower disposed at a first location opposing the first cutting blade and extending upstream of the first cutting blade with respect to the direction in which the conveyor conveys the glass tube, such that the first blower is configured to begin blowing air into an opening located at the other end portion of the glass tube before the first cutting blade begins cutting the end portion of the glass tube, and to continue blowing the air into the opening while the first cutting blade cuts the end portion of the glass tube; and
a second blower provided on a more downstream side of the conveying glass tube than the first cutting blade, and disposed at a second location opposing the second cutting blade and extending upstream of the second cutting blade with respect to the direction in which the conveyor conveys the glass tube, such that the second blower is configured to begin blowing air into a second opening located at the end portion of the glass tube that has been cut by the first cutting blade before the second cutting blade begins cutting the other end portion of the glass tube, and to continue blowing the air into the second opening while the second cutting blade cuts the other end portion of the glass tube.

8. The glass tube cleaning and cutting system according to claim 7, further comprising at least one suction device provided near at least one of the first and second cutting blades and configured to suck surrounding air at at least one of the end portion and the other end portion of the glass tube.

9. The glass tube cleaning and cutting system according to claim 7, wherein the temperature changing device comprises a preheat burner and a liquid container arrangement that are configured to, along with the first and second cutting blades, cooperatively impose the thermal shock on the outer circumference surface of the end portion and the other end portion of the glass tube.

10. The glass tube cleaning and cutting system according to claim 7, further comprising at least one suction device provided near at least one of the first and second cutting blades and configured to suck surrounding air at at least one of the end portion and the other end portion of the glass tube.

11. The glass tube cleaning and cutting system according to claim 7, wherein at least one of the first blower and the second blower includes a blowing nozzle having a flat-shaped nozzle port located along a conveyance route of the glass tube.

12. A method for cleaning and cutting a glass tube, comprising:
providing the glass tube cleaning and cutting system of claim 7,
a first blowing operation of operating the first blower to blow air into the opening located at the other end portion of the glass tube;
after the first blowing operation has already begin, performing a first cutting operation of operating the first temperature changing device and the first cutting blade to impose the thermal shock and the scratches on the outer circumference surface of the end portion of the glass tube to cut the end portion of the glass tube while continuing to perform the first blowing operation;
a second blowing operation of operating the second blower to blow air into the second opening located at the end portion of the glass tube that has been cut by the first cutting operation; and after the second blowing operation has already begun, performing a second cutting operation of operating the second temperature changing device and the second cutting blade to impose the thermal shock and the scratches on the outer circumference of the other end portion of the glass tube to cut the other end portion of the glass tube while continuing to perform the second blowing operation; the first and second cutting operations being performed while the rotator is rotating the glass tube about the tube axis of the glass tube and the conveyor is conveying the glass tube in a direction transverse to the tube axis of the glass tube.

13. The method for cleaning and cutting a glass tube according to claim 12, further comprising:
sucking surrounding air at the end portion of the glass tube while performing the first cutting operation.

\* \* \* \* \*